(12) United States Patent
Hung

(10) Patent No.: US 8,286,515 B2
(45) Date of Patent: Oct. 16, 2012

(54) METHOD AND A DEVICE FOR VERIFYING MASS INSIDE A QUILT

(75) Inventor: Cheng-Kuan Hung, Tokyo (JP)

(73) Assignee: Yusho Co., Ltd., Tokyo (JP)

( * ) Notice: Subject to any disclaimer, the term of this patent is extended or adjusted under 35 U.S.C. 154(b) by 868 days.

(21) Appl. No.: 12/009,727

(22) Filed: Jan. 22, 2008

(65) Prior Publication Data

US 2009/0183582 A1    Jul. 23, 2009

(51) Int. Cl.
*G01N 19/00* (2006.01)
(52) U.S. Cl. .................................................... 73/865.8
(58) Field of Classification Search ................. None
See application file for complete search history.

(56) References Cited

U.S. PATENT DOCUMENTS

| 2,217,621 | A | * | 10/1940 | Katzner | 5/502 |
| 2,701,980 | A | * | 2/1955 | Abbott | 356/238.1 |
| 4,952,062 | A | * | 8/1990 | Bean et al. | 356/430 |
| 5,046,844 | A | * | 9/1991 | Milton | 356/238.1 |
| 5,152,600 | A | * | 10/1992 | Boring | 362/97 |
| 2002/0009212 | A1 | * | 1/2002 | Urano et al. | 382/111 |
| 2008/0002196 | A1 | * | 1/2008 | Yoo | 356/238.1 |

* cited by examiner

*Primary Examiner* — Robert R Raevis
(74) *Attorney, Agent, or Firm* — Pro-Techtor Int'l Services

(57) ABSTRACT

A method and a device for verifying mass inside a quilt is provided. A top of a box of a write-through device is placed with the quilt, which is unfolded and paved, and which is then put with a transparent platen. The quilt is next gently pressed and fixed by a semi-transparent board of the box, and the box rotates twice and stops at a vertical position. When the quilt is photographed under a write-through condition, one photo which is put in a transparent bag, and the other photo which is a locally exploded picture of the quilt, are attached on proper positions of the quilt.

2 Claims, 3 Drawing Sheets

METHOD AND A DEVICE FOR VERIFYING MASS INSIDE A QUILT

BACKGROUND OF THE INVENTION a) Field of the Invention

The present invention relates to a method and a device, and more particularly to a method for verifying mass inside a quilt which is loaded with cottons or feathers, and a device used for the verification.

b) Description of the Prior Art

A conventional way to verify mass inside a quilt, which is loaded with cottons or feathers, is to load the cottons or feathers of a required quantity inside a bat, with a surface and an interior of the bat being sewn as bag-shape objects. Whether the aforementioned filling material is filled uniformly in the quilt is usually determined by touching with hands back and forth on a surface of the quilt. However, to extend the cottons to a same thickness is very difficult, as the cottons are very thick at some places inside the quilt, while others are very thin. In addition, the cottons of different thicknesses are usually mixed together; therefore, it will be very difficult to check mass by a sense of touch with hands moving back and forth on the surface of the quilt.

Moreover, as peripheries of the quilt have been sewn, an ordinary person is unable to verify the mass of material which is loaded inside the quilt. Therefore, a conventional way is to form a transparent window at a part of the quilt with a small zipper to verify the internal material. As the part that can be verified is only a small portion of the quilt and the overall condition cannot be verified, a consumer will still have a doubt about the mass of the quilt when purchasing the quilt.

Accordingly, the present invention is to provide a method and a device allowing the consumer to easily verify whether the material inside the quilt belongs to a same material and is uniformly loaded, as well as whether there is mixed with foreign materials, strings or foots, so as to purchase comfortably. Furthermore, vendors who produce and finish the quilts can also verify whether a same material is used for the quilt and whether the entire bat has been filled uniformly, in an operation process.

SUMMARY OF THE INVENTION

The primary object of the present invention is to sew a surface and an interior of a quilt with white cottons to form bag-shape objects, fill the cottons or feathers of a proper quantity inside the bag, unfold and pave the quilt on a box of a write-through light box, photograph the quilt under a condition that the entire quilt can be written through, cut the photos into proper sizes and then attach them on the aforementioned quilt.

The write-through light box has a first chamber with lighting equipment and a second chamber in which the quilt is paved. For the purposes of this disclosure, "write-through" is defined as a condition in which a shadow image of the quilt and filling is displayed on the transparent back platen, as projected by light from said lighting equipment passing through said semi-transparent board and the quilt with filling, with sufficient light intensity to reveal the distribution of filling in the quilt, for making photographs of said shadow image of the quilt as displayed on the transparent back platen.

Another object of the present invention is to pave the quilt on a write-through platform, and use a transparent platen to press on the quilt to verify the mass inside the quilt.

Still another object of the present invention is to attach one photo which is taken under the condition that the entire quilt is written through, and the other photo which is taken when the quilt is written through locally, on proper positions of the aforementioned quilt.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
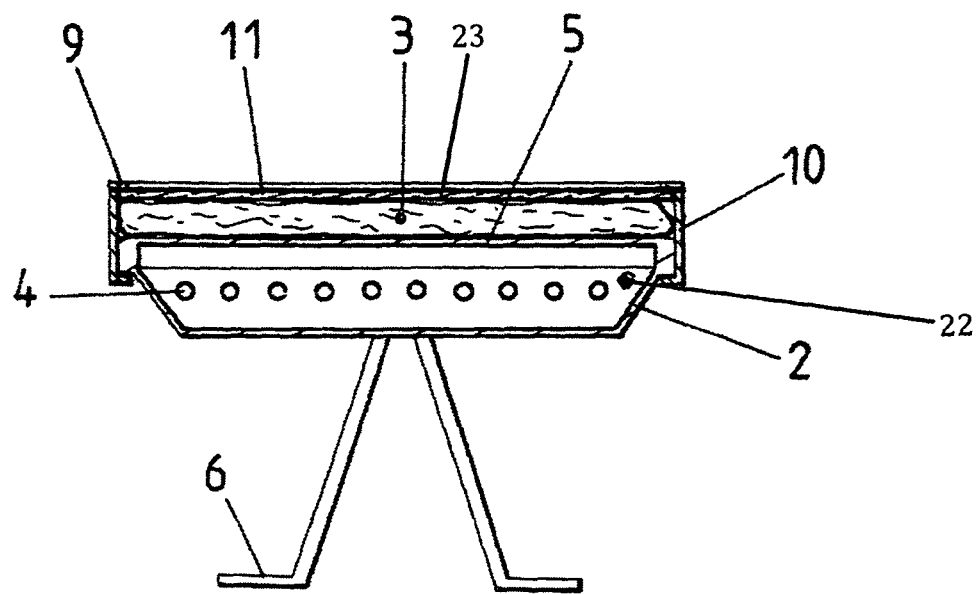
FIG. 1 shows a cross sectional view of a write-through device of the present invention, under a usage condition.

Referring to FIGS. 1 to 4, an apparatus for visualizing the uniformity of filling mass inside a quilt of the present invention is used to check whether mass of a filling material which is loaded into a quilt is uniform. An interior first chamber 22 of a write-through light box 2 is parallel disposed with a plurality of lighting equipment 4 forming a planar array on which is provided with a semi-transparent board 5, separating said first chamber from a second chamber 23 which is paved with a quilt 3, with a size of the box 2 being able to unfold the quilt 3, a central part of each of two sides of the box 2 is provided respectively with a support leg 6, the box 2 rotates using a central axis 7 in the box 2, and the box 2 is provided with a stop 8 allowing the box 2 to be held on a vertical position.

The box 2 is provided with a transparent back platen 9 which is used to press gently the quilt 3 which is paved on the semi-transparent board 5 of the box 2. Moreover, an upper side of a peripheral top frame 10 of the transparent back platen 9 is provided with a transparent board 11, and the peripheral top frame 10 is tightened or disassembled by a tightening piece 12.

For the purposes of this disclosure, "write-through" is defined as a condition in which a shadow image of the quilt and filling is displayed on the transparent back platen, as projected by light from said lighting equipment passing through said semi-transparent board and the quilt with filling for making photographs of said shadow image of the quilt as displayed on the transparent back platen.

Therefore, when using the aforementioned write-through device 2 to take a write-through shot to the quilt 3 made by white cottons, the quilt 3 must be paved on a top of the box 2 and pressed by the platen 9, such that the quilt 3 can be clamped between the transparent board 11 above and the semi-transparent board 5 below, and can be locked by the tightening piece 12 under a fixation condition.

Figure 2:
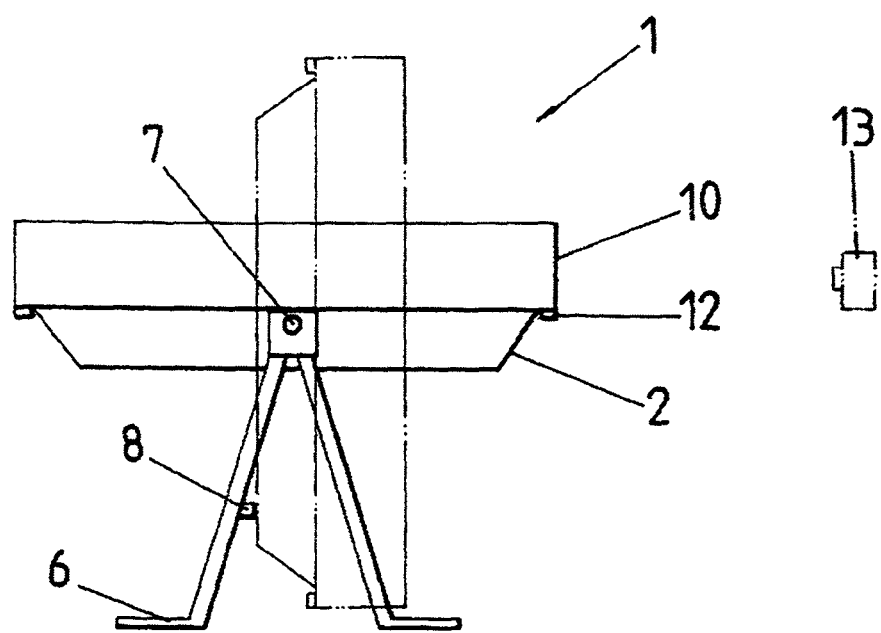
FIG. 2 shows a side view of a write-through device of the present invention.
Figure 3:
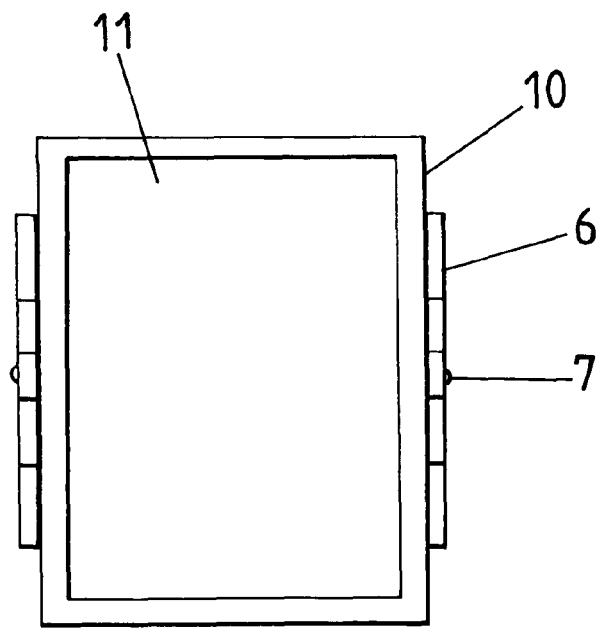
FIG. 3 shows a front view of a write-through device of the present invention.
Figure 4:
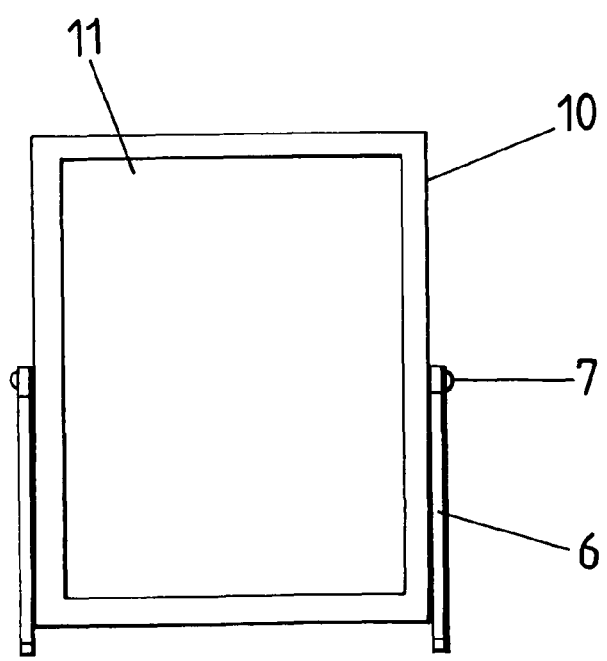
FIG. 4 shows a plan view of a write-through device of the present invention.

Referring to FIG. 2, an imaginary dash line shows that the box 2 is held on the vertical position after rotating, and the quilt 3 is photographed by a camera 13 at a configured position of a write-through condition.

Figure 5:
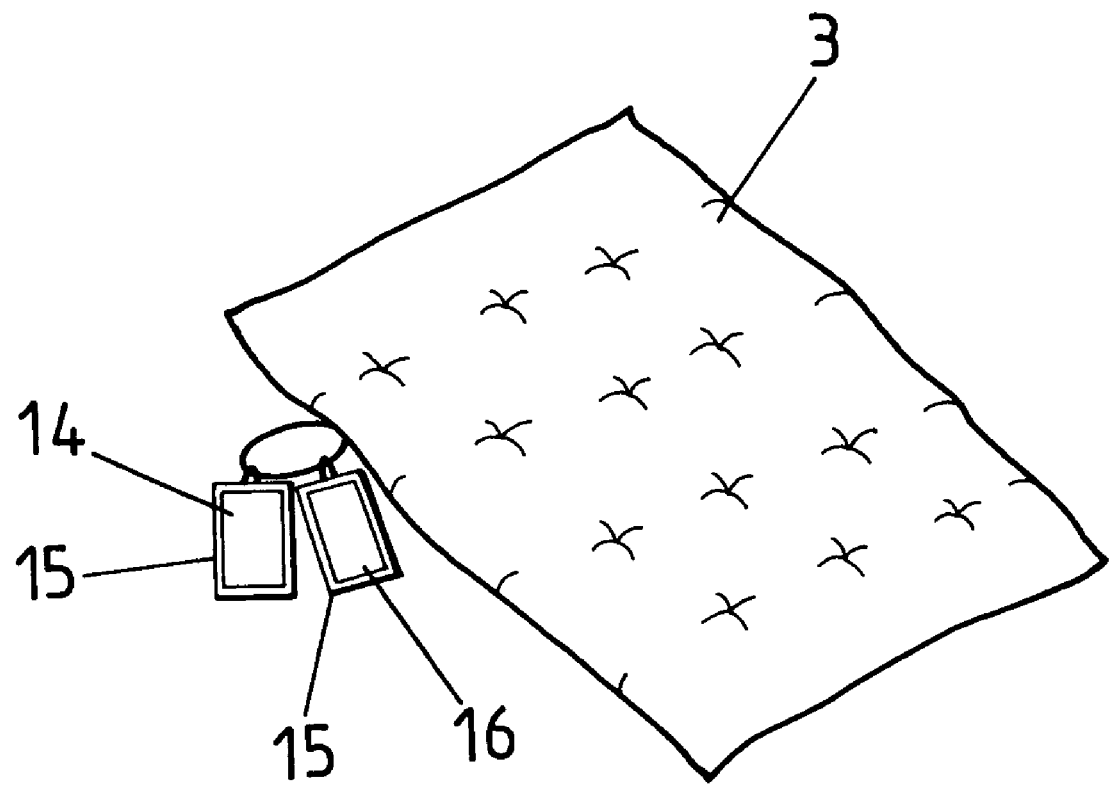
FIG. 5 shows a schematic view of the present invention wherein a write-through photo which is shot at a proper position of a quilt is attached.

Referring to FIG. 5, a photo 14 of the write-through photographing described above is put into a transparent bag 15 of a proper size, and then is attached on a proper position of the photographed quilt 3.

On the other hand, a locally exploded photo 16 of the aforementioned write-through photo 14 can be attached together, if necessary. This attached photo 16 can be another locally exploded photo of the quilt 3; therefore, an auxiliary effect can be developed to verify an internal condition of the quilt as it will be clearer, in spite that the exploded photo 16 is only a locally exploded diagram of the quilt 3.

Accordingly, the present invention is provided with following results:

1. The surface and interior of the quilt are sewn with the white cottons to form as the bag-shape objects into which are filled with the cottons or feathers of the proper quantity. The quilt is unfolded and paved on the box of the write-through device and is photographed under the condition that the entire quilt can be written through. After photographing, the photos are cut into the proper sizes and then are attached on the exterior of the quilt. As an extent of luminosity will be affected by uniformity of the internal material distributed in the quilt, when the quilt contains foreign materials, strings or foots, the photos of explicit contrast will be formed, and from the photos one can verify the uniformity of the filling material and mass distributed inside the quilt.

2. The quilt is directly paved on the write-through platform and is pressed by the transparent platen, such that clearer photos can be taken.

3. One photo attached in FIG. 5 described above is taken under the condition that the entire quilt is written through, whereas the other one is taken when the quilt is written through locally. Therefore, two photos in total are attached on the proper positions of the quilt, and by contrasting these two photos, it will be easier to verify whether the filling material is distributed uniformly, so as to be sure of the mass inside the quilt.

4. The box is installed with the lighting equipment above which is the semi-transparent board for writing through. The size of the box should be that the quilt can be paved on it, and the central part of each of the two sides of the box is installed with the support leg. The box rotates with the upper parts of the support legs as the axes, until the top of the box is in the vertical position. The periphery of the transparent board is provided with the frame to facilitate assembling and disassembling the platen at the upper side of the box. As the quilt which is paved on the box is pressed by the platen, this device allows the quilt to be photographed under the condition that the entire quilt is written through, thereby obtaining the clear photos inside the quilt.

As is apparent from the foregoing, when a consumer is purchasing the cotton quilt or feather quilt of the present invention, he or she can purchase comfortably as the uniformity of the filling material and mass inside the aforementioned quilt can be easily verified.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A method for verifying mass inside a quilt, wherein an surface and an interior of the quilt are sewn with white cottons to form as bag-shape objects into which are filled with the cottons or feathers of a proper quantity, the quilt is unfolded and paved on a semi-transparent board of a write-through light box and is photographed under a condition that the entire quilt is written through, finally, the photos after photographing are attached on the aforementioned quilt.

2. The method for verifying mass inside a quilt according to claim 1, wherein one photo attached is taken when the entire quilt is written through, and the other one is taken when the quilt is locally written through; two photos in total being attached on proper positions of the aforementioned quilt.

* * * * *